United States Patent
Eicher (10) Patent No.: US 7,136,827 B2
(45) Date of Patent: Nov. 14, 2006

(54) METHOD FOR EVALUATING A BUSINESS USING EXPERIENTIAL DATA

(75) Inventor: Jill Eicher, Glencoe, IL (US)

(73) Assignee: Blake Morrow Partners LLC, Chicago, IL (US)

( * ) Notice: Subject to any disclaimer, the term of this patent is extended or adjusted under 35 U.S.C. 154(b) by 0 days.

(21) Appl. No.: 11/005,119

(22) Filed: Dec. 6, 2004

(65) Prior Publication Data

US 2005/0125324 A1 Jun. 9, 2005

Related U.S. Application Data

(60) Provisional application No. 60/527,688, filed on Dec. 5, 2003.

(51) Int. Cl.
G06Q 10/00 (2006.01)
(52) U.S. Cl. .................................................. 705/10
(58) Field of Classification Search ................. 705/11, 705/7, 10
See application file for complete search history.

(56) References Cited

U.S. PATENT DOCUMENTS

| | | | |
|---|---|---|---|
| 5,909,669 A * | 6/1999 | Havens | 705/11 |
| 2003/0023543 A1 | 1/2003 | Gunewardena et al. | |
| 2003/0046219 A1 | 3/2003 | Rosedale et al. | |
| 2003/0065543 A1* | 4/2003 | Anderson | 705/7 |
| 2003/0182181 A1* | 9/2003 | Kirkwood et al. | 705/11 |
| 2004/0054563 A1 | 3/2004 | Douglas | |
| 2004/0068431 A1* | 4/2004 | Smith et al. | 705/10 |
| 2004/0128187 A1* | 7/2004 | Neuberger et al. | 705/10 |
| 2005/0021360 A1 | 1/2005 | Miller et al. | |
| 2005/0027645 A1 | 2/2005 | Lui et al. | |
| 2005/0043976 A1* | 2/2005 | Leehman | 705/7 |
| 2005/0065754 A1 | 3/2005 | Schaf et al. | |
| 2005/0144114 A1 | 6/2005 | Ruggieri et al. | |
| 2005/0197952 A1 | 9/2005 | Shea et al. | |

FOREIGN PATENT DOCUMENTS

WO WO 00/68861 * 11/2000

OTHER PUBLICATIONS

"Taking Performance Measurement to the Next Level". PC Listens. 2002.*
Howes, Peter; Foley Pat. "Strategic Human Resource Management: An Australian Case Study". HR: Human Resource Planning. 1993. vol. 16, Issue 3.pp. 53-64.*
Ulrich, Dave. "Profiling Organizational Competitiveness: Cultivating Capabilities". HR: Human Resource Planning. 1993. vol. 16, Issue 3. pp. 1-17.*
Kennedy, Eric; Rourke, Dan. "Once Upon a Benchmark". HR: Human Resource Planning. 1993. vol. 16, Issue 3. pp. 27-33.*

* cited by examiner

Primary Examiner—Susanna M. Diaz
Assistant Examiner—Peter Choi
(74) Attorney, Agent, or Firm—Sterne, Kessler, Goldstein & Fox P.L.L.C.

(57) ABSTRACT

A method for evaluating and quantifying the risk, performance and potential of a business is disclosed. Experiential data generated by the business' activities is extracted and used as source data in evaluating the business. Experiential data includes both qualitative and quantitative information compiled from operating systems, databases, interviews, paper-based files and financial records. Business activities are measured individually and then collectively to understand the business as a whole. A set of metrics and a series of algorithms are used to measure the risk, performance and potential of the business drawing from the outset on the experiential data collected and a comparison to industry best practices.

27 Claims, 6 Drawing Sheets

METHOD FOR EVALUATING A BUSINESS USING EXPERIENTIAL DATA

CROSS-REFERENCE TO RELATED APPLICATION

This application claims priority from U.S. Patent Application No. 60/527,688, entitled "METHOD FOR ASSESSING, MEASURING AND RATING OPERATIONAL PERFORMANCE OF HEDGE FUND BUSINESS," filed on Dec. 5, 2003.

BACKGROUND

1. Field of the Invention

The present invention relates to a method of measuring enterprise risk, performance, and potential, and more particularly, measuring the enterprise risk, performance, and potential of financial services businesses.

2. Background

Businesses generally strive to improve performance and lower risk with the goal of enhancing business potential. Financial services businesses, however, typically have more data, information and systems to measure the performance and risk of their investment portfolios than they have to manage the businesses supporting those portfolios. As a result, financial services businesses have scant and fragmented information about their business operations, particularly information related to enterprise risk, performance and potential.

To evaluate enterprise (or operational) risk, prior art methods use loss event narrative summaries as source data, usually excerpted from loss event logs maintained by a compliance officer. This information summarizes past loss events in an effort to raise awareness and to document the type, frequency and magnitude of loss events. While instructive in understanding what happened and the resulting consequences, this approach does not lend itself to proactive loss prevention, thus calling into question the efficacy of traditional source data and enterprise risk methods.

In the financial services industry, the data, information and systems available to manage investment portfolios are highly sophisticated and comprehensive, however, there is little in the way of data, information or systems to manage investment businesses. Prior art methods use portfolio performance data to gauge how well a financial services business is performing and make no attempt to access or employ business operating data. This results in a lack of understanding about the business operations of financial services businesses and a dependence on anecdotal information to make business decisions.

Lacking data, information and systems, the various constituencies of financial services businesses operate with an isolated view and do not have the means to understand the interdependencies across business lines, nor the impact of those interdependencies on the business. In addition, they do not have a quantitative framework to evaluate the business as a whole. Thus, there is no enterprise, or "big picture," view to work from either to measure business performance or to root out operational problems or inefficiencies. Further, there is no effective way to measure business risk or identify and address risk exposure issues.

To understand the ability of a financial services business to perform well in the future, prior art methods rely on past performance history despite the conventional wisdom that past performance is not indicative of future results. What's more, this data concerns only investment results and not the people, processes and technology having generated the results. Consequently, this approach does not provide a forward-looking perspective and provides little insight to understanding a financial services business.

SUMMARY OF THE INVENTION

The present invention provides a method for evaluating a financial services business, such as an asset management business or hedge fund, by using experiential data, i.e., data produced in the course of operating the business, to measure business risk, performance, and potential. The business is broken down into functions, each function being carried out through a number of activities. Each activity produces experiential data, i.e., data produced by performing the activity. Experiential data includes both qualitative and quantitative information compiled from operating systems, databases, interviews, paper-based files and financial records. Activities and functions are measured individually and then collectively to understand the business as a whole.

A specific set of mathematical functions, referred to as metrics and algorithms, are applied to the collected experiential data to measure enterprise risk, performance, and potential. The measures generated are expressed as Key Business Indicators (KBIs), Operational Performance Benchmarks (OPBs), enterprise risk, business drivers and consistency potential. These measures provide a business rating for each function, activity, and the business (or enterprise) as a whole.

The inventive method measures the potential of a financial services business to perform consistently over time by assessing experiential data extracted from the full spectrum of the business' functions and activities. The extracted data is fed into a series of metrics and algorithms that measure how well a business is performing from an operational (i.e., non-investment) standpoint. The information generated by the metrics is then compared to industry best practices and ultimately combined, or rolled up, to assess enterprise risk, performance, and potential.

Two levels of analysis and perspective are provided, one at the functional level of the business (i.e., how well are the individual business functions performing) and the other, at the enterprise level (i.e., rolling up the business functions to understand the business as a whole). In this way, the present invention provides 1) an understanding of the interdependency of the individual business functions and their impact on the business as a whole, and 2) the ability to quantify the effect and impact those interdependent relationships have on the business as a whole.

In addition, the present invention may be applied to examine specific aspects of a financial services business, and thus hone in on a particular area of concern. For example, the inventive method can be used to measure:

the level of operational risk;
the likelihood the business will perform consistently;
the effectiveness of the decision-making process;
alpha generation (growth in excess of market appreciation);
the short and long-term scalability of the business infrastructure;
the appropriateness of policies and procedures;
the adequacy of oversight and controls;
whether the business is being run responsibly; and
current practices as compared to best practices.

The method enables financial services businesses to utilize their own operational information to more effectively manage their businesses. Instead of having to rely on anecdotal information, they are able to manage their businesses as effectively as they manage their portfolios. The method also allows financial services businesses to provide quantitative information about their businesses to the financial institutions employing them as a supplement to traditional investment results and qualitative survey information.

The method enables financial institutions to quantitatively evaluate the businesses of the asset managers they employ or are considering for employment. Further, financial institutions can understand an investment strategy within the context of the business supporting it rather than looking at the strategy in isolation.

In further detail, the method comprises the steps of selecting a function; collecting data relevant to the function; selecting an activity; selecting a benchmark; applying a corresponding set of metrics to the data to produce metric values; determining a key business indicator (KBI) as a function of the activity and the benchmark; calculating a KBI value as a function of the metric values; comparing the KBI to a best practice indicator; and, determining a performance rating as a function of the KBI value.

In accordance with an alternative embodiment of the present invention, computer-executable process steps in a computer-readable format for carrying out the method is disclosed as well.

DETAILED DESCRIPTION

The present invention provides a method whereby the experiential data of a business is used to measure enterprise risk, performance, and the potential of the business to perform consistently over time. To do so, the method uses the experiential data of the business to fuel specific, predetermined mathematical functions, or metrics and algorithms, to measure specific drivers of the business being evaluated. For example, a set of drivers may include: productivity, scalability, profitability, alpha generation and operational risk; and ultimately the potential of the business.

The first step is gathering data. The data is compiled from the business processes supporting the functions and activities of the business being evaluated. Businesses are often thought of in terms of departments, however, the inventive method organizes a business by function and activity for greater specificity. Within each function is a sub-set of activities that make up the function. An exemplary set of functions and their associated activities is listed in Table 1.

TABLE 1

Business Organization by Function and Activity.

| Function | Activities |
| --- | --- |
| Research | Idea generation |
| | Implementation strategy |
| Portfolio Management | Investment due diligence |
| | Strategy & execution |
| | Investment risk management |
| Sales | Market research |
| | New business |
| | Prospective development |
| Client Service | Communication |
| | Retention |
| Management/General Partners | Alpha generation |
| | Business strategy & execution |
| | Compensation |
| | Governance/ownership |
| Treasury | Cash management |
| | Human resources |
| | Margin/financing |
| | Securities lending |
| Compliance | Business risk management |
| | External compliance |
| | Internal oversight |
| Controller | Audit/tax |
| | Corporate finance |
| | Portfolio (Partnership) accounting & reconciliation |
| | Pricing |
| Operations | Corporate actions |
| | Portfolio recordkeeping |
| | Proxy voting |
| | Trade capture |
| | Trade error resolution |
| | Trade settlement |
| Information Technology | Business continuity |
| | Security |
| | System administration |
| | System development |
| | Web presence |

Figure 1:
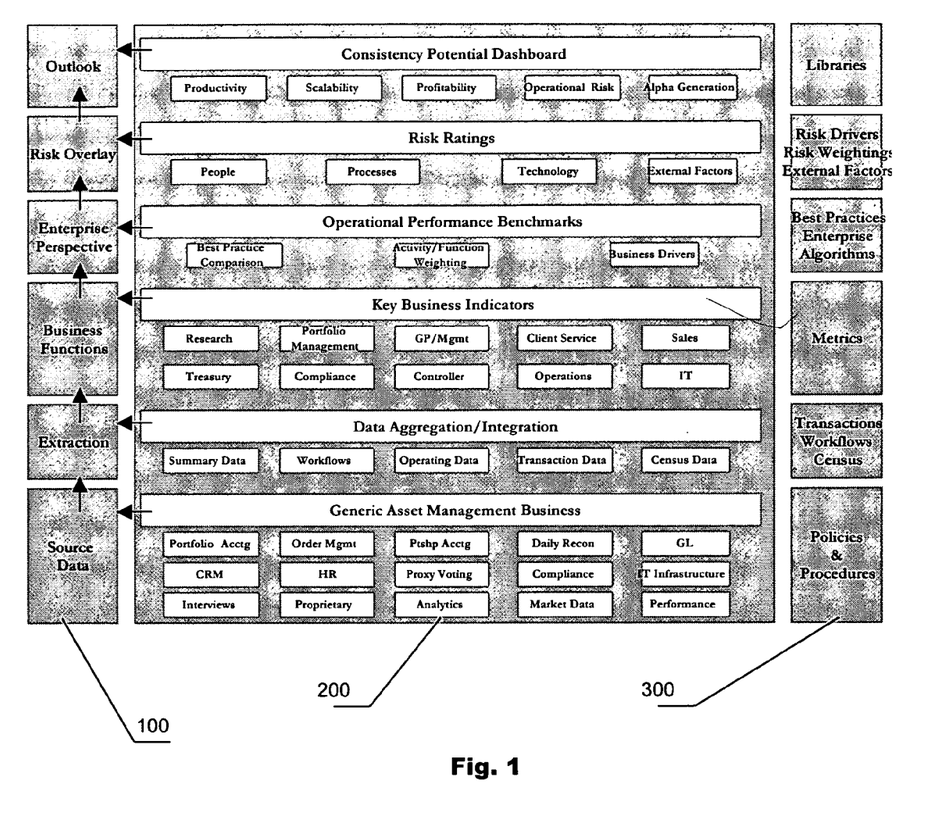
FIG. 1 illustrates the broad steps of a method in accordance with an embodiment of the present invention.

FIG. 1 illustrates the major, broad steps and information involved with the inventive method, working from the bottom of the diagram to the top. The left column 100 represents a broad description of the general steps for the present invention. The middle column 200 represents the data associated with each step at its respective horizontal position. For example the Extraction step in the left column 100 is on the same line as "Summary Data," "Workflows," "Operating Data," and Transaction Data." The step of Extraction produces the data groups listed next to it. The column 300 on the right is a list of the libraries, or databases in which information is organized and maintained.

As previously mentioned, the first step is to collect source (or experiential) data at the bottom of the left column 100. The areas of a business generating the source data are listed next to "Source Data". Above "Source Data" is "Extraction" with the extraction results listed next to it.

Metrics and algorithms are applied to source data 200 to measure the performance of the functions and activities supporting the business in the "Business Functions" step. These measures, or criteria, may be expressed as key business indicators (KBIs), operational performance benchmarks (OPBs), enterprise risk, business drivers (productivity, scalability, profitability, alpha generation and operational risk) and consistency potential. The selected measures, or criteria, produce an evaluation and rating for each function, activity, and the business (or enterprise) as a whole. This analysis is done at the enterprise level (business as a whole)

in "Enterprise Perspective." Risk is assessed in "Risk Overlay," and a measure of consistency potential is produced in "Outlook."

For example, the Research Function of Table 1 includes two activities, Idea Generation and Implementation Strategy. In other words, the Research function generates ideas and formulates strategies for implementing those ideas. The Research function's work process is scrutinized and subjected to specific statistical and mathematical analysis represented by a set of metrics designed to evaluate the specific activities of the Research function.

Assume a set of metrics for the Research function measures the productivity of the activities. For example, to measure the productivity of "Idea Generation," the frequency with which new ideas are generated, the quality of the ideas, and whether they are generated on a timely basis, would all be considered. Each of these criteria can be measured by metrics. Metrics may also be a certain statistical analysis, for example, the percentage of ideas generated that increase investment results. The metrics for "Implementation Strategy" might then include the frequency with which strategies are formulated, the quality of the strategy, and whether they are implemented on a timely basis.

These metrics establish a baseline of current operational performance that comprises the fundamental building blocks to understanding how well the business is performing. In this example, the metrics are designed to gauge how well the people, processes and technology involved in the activities within the Research function are performing. By using the experiential data of the business activities to establish a baseline of performance, the business owner can evaluate the effectiveness of the activities over time as well as measure the impact of business dynamics on the activities.

Pre-selected metrics are then combined to calculate Key Business Indicators (KBIs) for each activity. Selection is based on the critical aspect or task of the specific activity, and indicates how well the specific activity is performing in that one critical aspect. For example, a KBI for Idea Generation might be "the number of new ideas generated in the period that were presented to the investment committee and given a green light for further analysis." A KBI for the Implementation Strategy might be "the number of new ideas approved for implementation into the portfolio". A KBI is a definitive, quantitative measure of each activity's performance.

To quantify and determine the performance of the Research function as a whole, the activities within the function are weighted by their importance to the function. That is to say, the Research function KBI score is calculated by averaging the weighted KBIs of Idea Generation and Implementation Strategy, the two activities that comprise the Research function.

After calculating the KBIs for each activity, the analysis continues while shifting focus from the functional level of the business to the enterprise level. Each of the activity KBIs is calculated in the same way as the example set out above for the Research Function. The shift to the enterprise level is accomplished by first aggregating the metrics and KBIs by business driver. As discussed previously, in this example, each metric and KBI is linked at the outset to one of four business drivers: productivity, scalability, profitability or alpha generation. An example of a productivity metric has already been used in the discussion of Research activities and functions ("the number of new ideas generated in the period that were presented to the investment committee and were approved by the committee for further analysis.").

Figure 2:
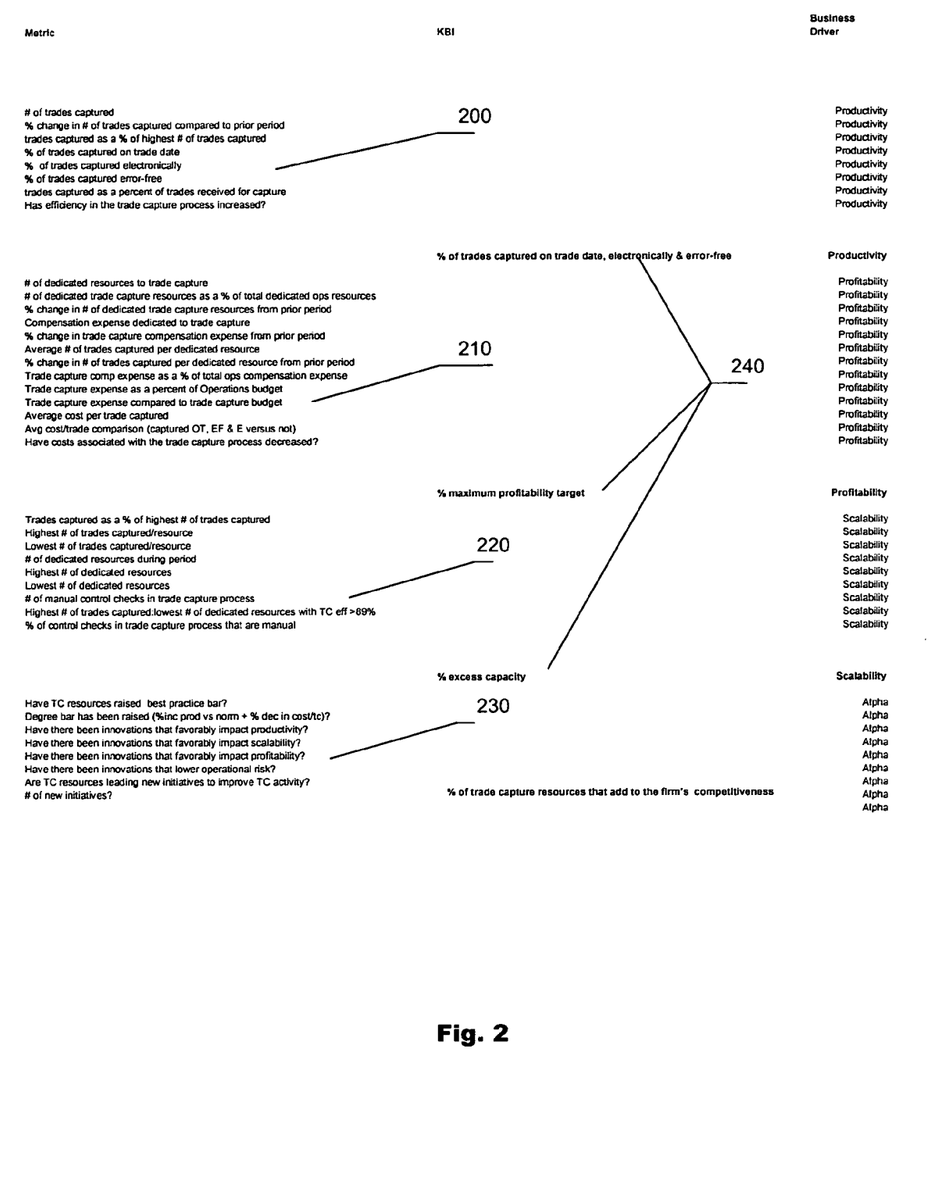
FIG. 2 illustrates an exemplary set of metrics, KBIs and their corresponding Business Drivers for the trade capture process in accordance with the method of the present invention.

Additionally, FIG. 2 provides more examples of activities metrics and their corresponding business drivers as will be discussed below.

After the metrics and KBIs have been organized by business driver, the workflows of the activities are compared to industry best practices. For this simplified example, some of the industry best practices for Idea Generation include: 1) documenting the inspiration source for the new idea; 2) documenting the source data used in formulating the new idea; and 3) dating, documenting and signing all the steps in the formulating of the new idea. Enhancements to, or deviations from, industry best practices are scored. In this way, the inventive method provides a quantitative framework to easily identify and quantify performance contributors or detractors.

Following the best practice comparison of the activities workflows, the functions are weighted by their importance to the business. These weightings are determined by a proprietary series of algorithms designed to account for the interdependence of the functions. The collective information—metrics, KBIs, best practice comparisons and function weightings—is then used to calculate the productivity, scalability, profitability and alpha generation levels of the business. These measures are intermediate calculations and referred to as the Operational Performance Benchmarks (OPBs) for the purposes of this explanation as they do not yet include an operational risk perspective. The OPBs provide an understanding of the interdependence of the business activities and functions and their relation to the business as a whole.

After the Operational Performance Benchmarks have been computed, a risk assessment is performed. The risk assessment is based on a number of factors, typically those that create a risk. For example, people, processes, technology and external factors. These risk factors are detailed in Table 2.

TABLE 2

Risk Factors.

| Risk Factors | Drivers |
|---|---|
| People | Appropriateness of skills & experience |
| | Adequacy of resources |
| | Stability of staff |
| | Commitment to ethics |
| | Level of oversight |
| Processes | Effectiveness of control checks |
| | Prevalence of manual processes |
| | Awareness of risk exposures |
| | Accuracy & timeliness of data access, handling, processing & delivery |
| | Separation of responsibilities, control checks & oversight |
| | Clarity of policies and procedures |
| Technology | Reliability |
| | Redundancy |
| | Security |
| | Contingency |
| External Factors | Awareness of external factors (physical environment, counterparty, regulatory) |
| | Preparedness to respond to external factors |

Risk assessment is accomplished by applying a risk assessment algorithm to the collective data to measure the operational risk of the activities, functions and the business as a whole. The KBIs and OPBs are then adjusted and weighted for operational risk resulting in final measures of productivity, scalability, profitability, alpha generation and operational risk for the business, or enterprise, as a whole.

The method culminates in computing a measure of the consistency potential of the business by factoring the preselected business drivers together, the process of which is described below. Staying with our previous example for consistency, there are five business drivers: productivity, profitability, scalability, alpha generation and operational risk.

Figure 3:
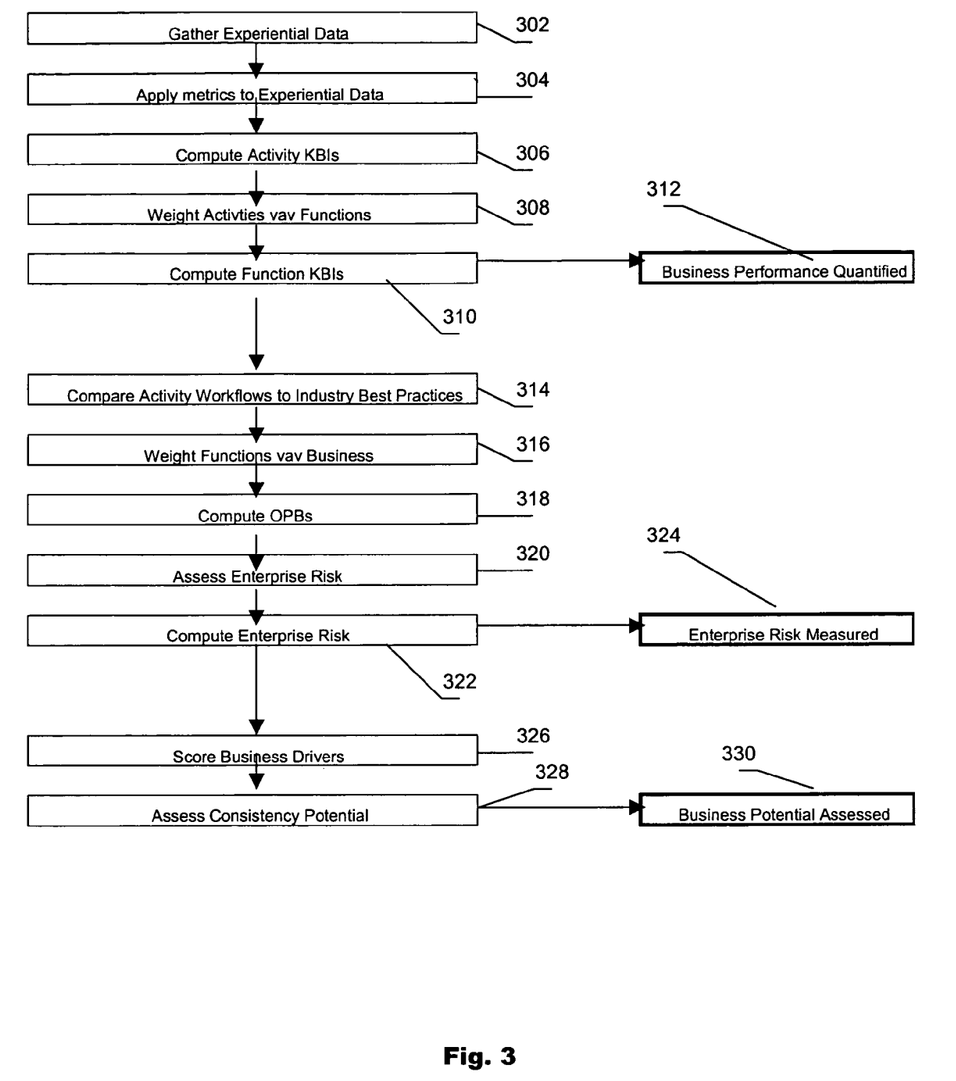
FIG. 3 is a flow chart illustrating the steps of a method in accordance with an embodiment of the present invention.

FIG. 3 is a flowchart illustrating the method according to a preferred embodiment of the present invention. For further illustration, the inventive method is applied to the Trade Capture activity of the Operations function to provide a detailed example.

The first step is to collect relevant data (step 302). For this example, since the Trade Capture Activity is being evaluated, the relevant data includes the experiential data (data from experience) produced by the trade capture activity. This data may be obtained from interviews, operating systems, databases, paper-based files and financial records.

Figure 4:
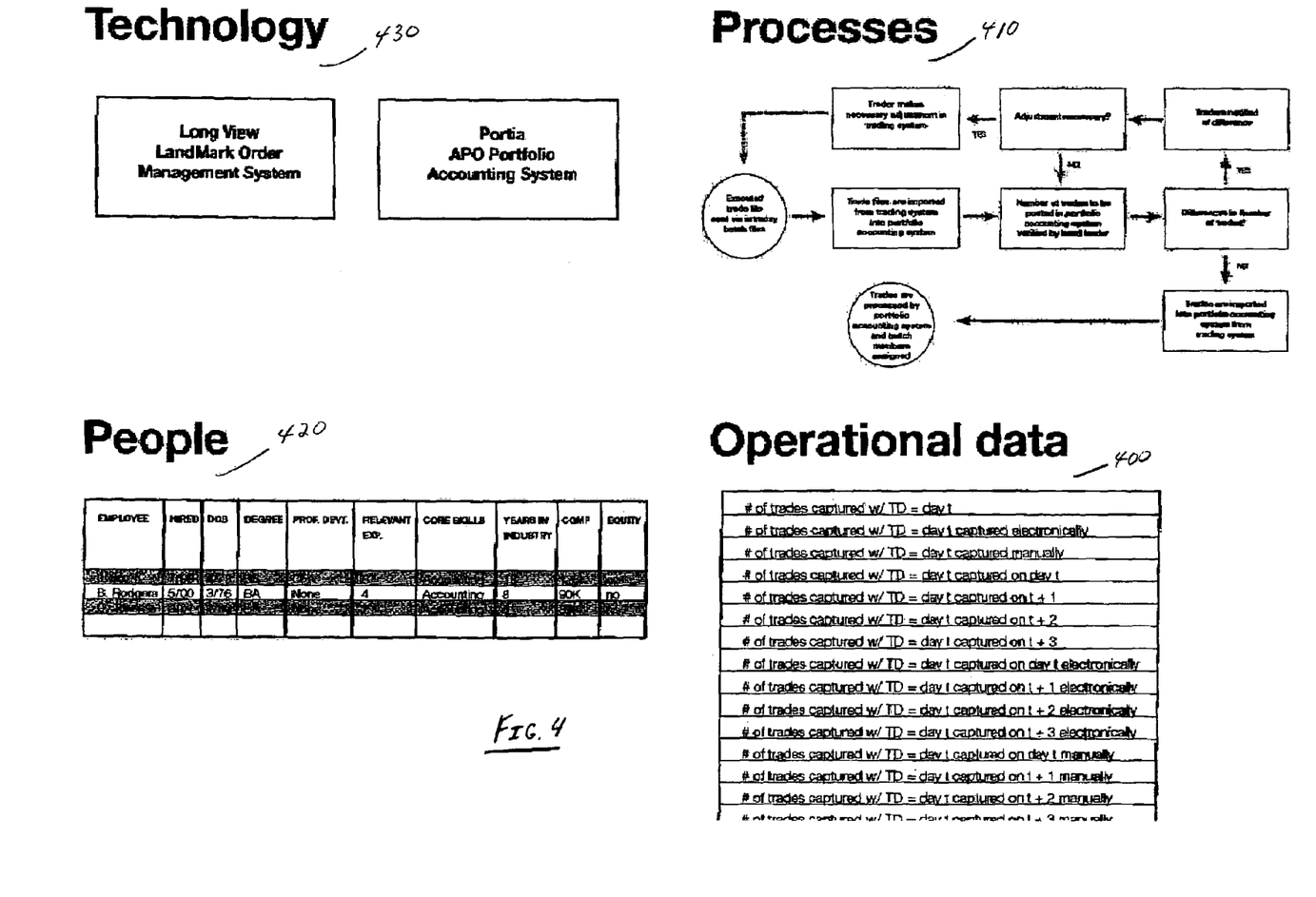
FIG. 4 is an exemplary set of experiential data for a trade capture activity in accordance with an embodiment of the present invention.

An exemplary set of relevant experiential data is listed in FIG. 4. In this example, the experiential data includes operational data 400, processes (mapped workflows) 410, people (census information) 420 and technology systems 430.

Referring back to FIG. 3, once the relevant data is collected (step 302), a specific set of metrics is applied to the collected operating data (step 304). These metrics translate the raw operating data into measures that correspond to a specific driver. For this example, there are four business drivers: productivity, scalability, profitability, and alpha generation. The first three are familiar in the business world and self-explanatory. The fourth, Alpha Generation, is the contribution by the people of the financial services business in excess of industry standards. For example, the alpha generated by the portfolio managers of the financial services business could be defined as their contribution to financial growth or profit realized, in excess of market appreciation. So, if the relevant market grew by 10% and the financial services business realized a profit of 15%, its' alpha contribution was 5%, i.e., the excess realized profit over market appreciation.

In this example, the inventive method uses five business drivers as the criteria by which the method measures a financial services organization. They are: productivity, scalability, profitability, alpha generation and operational risk. Only the first four, productivity, scalability, profitability, and alpha generation are linked to the metrics and the Key Business Indicators (KBIs). Operational Risk is applied later in the method according to an overlay algorithm.

For each activity, there is a specific, corresponding set of metrics to be applied to the activity's relevant experiential data. How many metrics and the ones used will depend on the activity being evaluated. Each activity is measured by a set of metrics linked to a business driver: productivity, scalability, profitability and alpha generation.

In this example using trade capture productivity metrics for productivity, the metrics are applied to the relevant experiential data and scored using simple math as shown in Table 3. The calculation results of Table 3 are only examples and the values have been arbitrarily chosen.

TABLE 3

Trade Capture Metrics for Productivity

Percent of trades captured on trade date = (trades captured on trade date/total number of trades = 88%)

TABLE 3-continued

Trade Capture Metrics for Productivity

Percent of trades captured electronically = (trades captured electronically/total number of trades captured = 87%)
Percent of trades captured error-free = (trades captured error-free/total number of trades captured = 82%)

After the metrics are scored, a KBI measuring trade capture productivity is calculated using simple math (step 306). The KBI is a predetermined measure of how well the particular activity is being performed. The KBI, like the set of metrics, is different for every activity and for each business driver. Thus, there are four different KBIs for the Trade Capture activity, one for each driver. An exemplary set of KBIs for the Trade Capture Activity is listed in Table 4.

TABLE 4

Trade Capture Activity KBIs.

| Business Driver | KBI |
| --- | --- |
| Productivity | Percent of trades captured on trade date, electronically and error-free. |
| Profitability | Percent of maximum profitability target. |
| Scalability | Excess capacity. |
| Alpha | Percent of trade capture resources that add to the firm's competitiveness. |

In this example, the Trade Capture Activity as it affects the driver Productivity, or, more simply put, trade capture productivity, is being evaluated. So the KBI corresponding to trade capture productivity is selected and applied to the metrics in Table 3 (step 306). In this example, for the Trade Capture Activity, the percentage of trades that are captured on trade date, electronically, and error free is the strongest indicator of operational performance of the Trade Capture Activity with respect to Productivity.

Looking at the values obtained by the metrics, the percentage of trades captured on the trade date, 88%, the trades captured electronically, 87%, and trades captured error-free, 82%, are extracted and their average obtained. In this case, the average of the three metrics is 85.6% or 86%. So, 86% (out of a possible 100%) of the trades captured are done so electronically, on the trade date and error-free. This value serves as the indicator of productivity for the Trade Capture Activity.

The method of the present invention calculates KBIs for the three other business drivers as well, following the same steps as described above for the trade capture productivity KBI. FIG. 2 lists the Productivity Metrics 200, the Profitability Metrics 210, the Scalability Metrics 220, and the Alpha Generation Metrics 230 along with their respective KBIs 240. Averages and percentages are obtained in the ordinary manner as is commonly known and practiced in the field of mathematics.

The Activities are weighted according to their importance and impact on their corresponding function (step 308). The weights are assigned according to the business being evaluated. For example, Research & Development (R&D) is more important to a pharmaceutical company than it is to a bank. In a pharmaceutical company, R&D would be more important and thus, carry more weight, when calculating function KBIs.

After all the Trade Capture Activity KBIs are calculated, their average is calculated to produce the Function KBI (STEP 310). For this example, the Trade Capture KBI, along with the five other activity KBIs within the Operations Function listed in Table 1, are averaged by their productivity KBIs, which is selected as the Primary Business Driver of the Operations Function to provide a quantified analysis of the Operations Function, or Performance Rating 312.

An exemplary set of Primary Business Drivers for each function of an asset management business is detailed in Table 5. The Primary Business Driver for each Function is the Driver that is most effected by the Function. So, for example, Sales affects Profitability more than the other Drivers.

TABLE 5

Primary Business Drivers.

| Function | Primary Business Driver |
|---|---|
| Research | Alpha Generation |
| Portfolio Management | Alpha Generation |
| GP/Management | Alpha Generation |
| Client Service | Profitability |
| Sales | Profitability |
| Treasury | Profitability |
| Compliance | Operational Risk |
| Controller | Operational Risk |
| Operations | Productivity |
| IT | Scalability |

For further illustration of activity metrics and their corresponding KBIs, a number of exemplary metric sets and KBIs for specific activities are provided. Table 6 shows a simplified exemplary set of data with its corresponding metrics and KBI for Trade Error Resolution Activity, and is similar to the steps of FIG. 3 for Trade Capture Activity.

TABLE 6

Trade Error Resolution Activity.

| Step | Action | Example Data/Metrics/KBI/Logic |
|---|---|---|
| Collect Data | Compile experiential data on activities | No. of trade errors No. of trade errors remedied electronically No. of trade error caused by counterparty error |
| Apply Metrics | Establish baseline of current operational performance, i.e., how well people, processes and technology are performing. | Avg. no. of daily trade errors Avg. time to remedy trade errors % of trade errors remedied electronically % of trade errors remedied before T + 2 electronically |
| Generate KBI | Combine metrics using computed ratios, averages and percentages to produce KBIs. | |
| Compute OPB | Compute productivity, scalability, profitability, and alpha generation by aggregating, factoring and weighting metrics, KBIs & best comparison results. | Weighting logic: Timely identification and quick remediation of trade errors is key to controlling costs and risk. |

Table 7 shows a simplified exemplary set of data with its corresponding metrics and KBI for Pricing Activity.

TABLE 7

Pricing Activity.

| Step | Action | Example Data/Metrics/KBI/Logic |
|---|---|---|
| Collect Data | Compile experiential data on activities | No. of securities with missing prices No. of manually priced securities No. of securities with price overrides No. of unsupervised and non-priced securities |
| Apply Metrics | Establish baseline of current operational performance, i.e., how well people, processes and technology are performing. | Avg. %. of securities priced daily Avg. % of securities priced manually Avg. % of unsupervised and non-priced securities. Avg. % of securities priced manually |
| Generate KBI | Combine metrics using computed ratios, averages and percentages to produce KBIs. | % of securities with manual price overrides |
| Compute OPB | Compute productivity, scalability, profitability, and alpha generation by aggregating, factoring and weighting metrics, KBIs & best comparison results. | Weighting logic: As the frequency and number of manually priced securities increases, so do costs and risk. |

Table 8 shows a simplified exemplary set of data with its corresponding metrics and KBI for Reconciliation Activity.

TABLE 8

Reconciliation Activity.

| Step | Action | Example Data/Metrics/KBI/Logic |
|---|---|---|
| Collect Data | Compile experiential data on activities | Total no. of position breaks No. of positions in portfolio No. of position breaks found through automated comparison |

TABLE 8-continued

Reconciliation Activity.

| Step | Action | Example Data/Metrics/KBI/Logic |
|---|---|---|
| Apply Metrics | Establish baseline of current operational performance, i.e., how well people, processes and technology are performing. | Avg. no. of position breaks % of total no. of positions with breaks Avg. time to remedy position breaks % of breaks identified electronically |
| Generate KBI | Combine metrics using computed ratios, averages and percentages to produce KBIs. | % of position breaks remedied in less than 2 days and via 1 notification |
| Compute OPB | Compute productivity, scalability, profitability, and alpha generation by aggregating, factoring and weighting metrics, KBIs & best comparison results. | Weighting logic: Position breaks increase cost and risk |

Table 9 shows a simplified exemplary set of data with its corresponding metrics and KBI for Proxy Voting Activity.

TABLE 9

Proxy Voting Activity.

| Step | Action | Example Data/Metrics/KBI/Logic |
|---|---|---|
| Collect Data | Compile experiential data on activities | Total no. of votes to vote No. of votes not voted No. of votes voted manually No. of votes archived |
| Apply Metrics | Establish baseline of current operational performance, i.e., how well people, processes and technology are performing. | % of votes voted manually % of votes not voted % of vote overrides |
| Generate KBI | Combine metrics using computed ratios, averages and percentages to produce KBIs. | % of votes, voted error-free & archived |
| Compute OPB | Compute productivity, scalability, profitability, and alpha generation by aggregating, factoring and weighting metrics, KBIs & best comparison results. | Weighting logic: Automation provides increased efficiency with lower cost and risk. |

The metrics and KBIs represent quantitative measures of how well the activities and functions of the business are performing.

Figure 5:
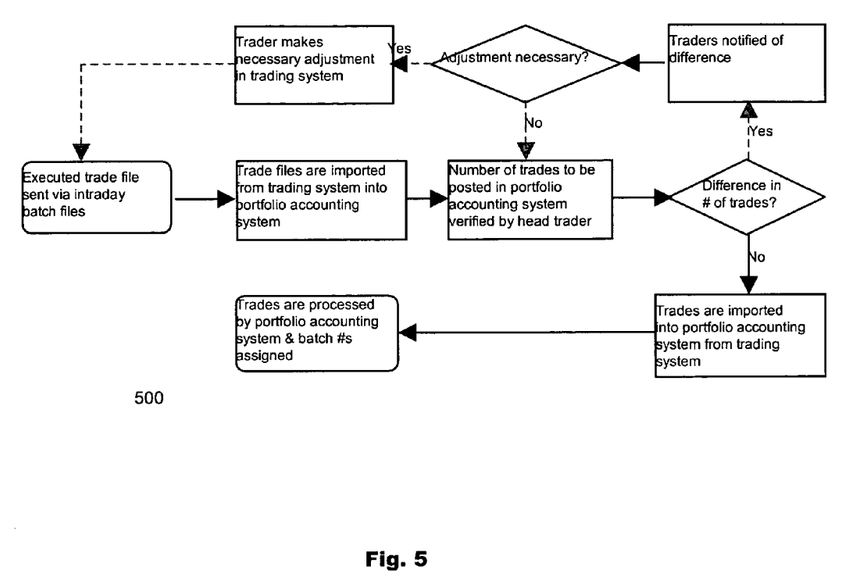
FIG. 5 is a mapped workflow of the trade capture process according to an embodiment of the present invention.

After the metrics (step 304) and KBIs (step 306) are calculated, the focus shifts to overall business, or enterprise, performance. The inventive method begins this next phase by utilizing the activity workflows gathered as experiential data (410 of FIG. 4). The trade capture activity workflow is illustrated in FIG. 5, generally indicated by reference numeral 500. The mapped workflow 500 is a flowchart for the steps that are taken in capturing a trade in the business being evaluated.

The mapped workflow of each activity is compared to industry best practices (step 314). Table 10 shows industry best practices for trade capture.

TABLE 10

Industry Best Practices for Trade Capture.

Verification of number of trades (inbound)
Verification of number of trades (outbound)

TABLE 10-continued

Industry Best Practices for Trade Capture.

Holdings check before trade capture
Authorization check before trade capture
Use of standard trade format
Time stamp (inbound)
Time stamp (outbound)
Assigned batch numbers to processed trades A comparison between the mapped workflow 500 and Industry Best Practices of Table 10 is made. The comparison between the Trade Capture Activity workflow and industry best practices is shown graphically in FIG. 6.

Figure 6:
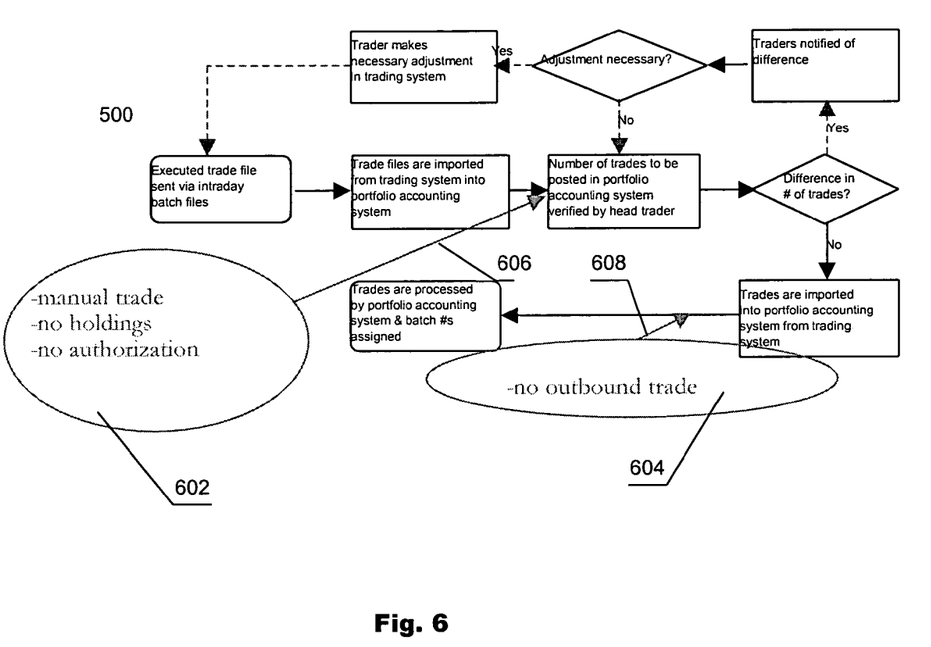
FIG. 6 is a comparison of the mapped workflow from FIG. 5 with industry best practices according to an embodiment of the present invention.

In the comparison process, enhancements to and deviations from industry best practices are noted. The mapped workflow deviates from industry best practice by executing trades manually, not holding checks before a trade capture, and not authorizing a check before trade capture 602. A link 606 shows where in the evaluated process 500 the deviation occurs. Another deviation occurs when the number of outbound trades is not verified 604. A corresponding link 608 indicates where, in the process, the number of outbound trades should be verified.

The impact of each enhancement and/or deviation is linked to one of the five business drivers: productivity, scalability, profitability, alpha generation or operational risk. For example, variances between the Trade Capture Activity workflow and industry best practices are shown in Table 11. An "X" indicates that the variance has an impact on the particular driver.

TABLE 11

Variances From Industry Best Practices.

| Variance | Productivity Impact | Scalability Impact | Profitability Impact | Alpha Impact | Risk Impact |
|---|---|---|---|---|---|
| Manual trade verification | X | X | X | | X |
| No holdings check before trade capture | | | | | X |
| No authorization check before trade capture | | | | | X |
| No outbound trade verification | | | | | X |

The variances (602 and 604 in FIG. 6) found in the comparison of the mapped workflow activity to industry best practices are then scored beginning with an impressed base score of 50.

Each variance has a pre-determined score depending on the business driver impacted by the variance. Variances that raise best practice standards are scored positively, variances that deviate from industry best practices are scored negatively. Best practice variance scores are shown in Table 12.

TABLE 12

Best Practice Assigned Variance Scores.

| Business Driver | Assigned Variance Score |
|---|---|
| Alpha Generation | 2.0 |
| Operational Risk | 1.5 |
| Scalabilty | 1.0 |

TABLE 12-continued

Best Practice Assigned Variance Scores.

| Business Driver | Assigned Variance Score |
|---|---|
| Productivity | .5 |
| Profitability | .25 |

To illustrate the scoring of an activity workflow comparison to industry best practices, the scored trade capture activity comparison to industry best practices is shown in Table 13.

TABLE 13

Trade Capture Comparison.

| Variance | Productivity Impact | Scalability Impact | Profitability Impact | Alpha Impact | Risk Impact |
|---|---|---|---|---|---|
| Manual trade verification | −0.5 | −1.0 | −.25 | | −1.5 |
| No holdings check before trade capture | | | | | −1.5 |
| No authorization check before trade capture | | | | | −1.5 |
| No outbound trade verification | | | | | −1.5 |

To compute the score for the trade capture activity comparison to industry best practices, or the Trade Capture Activity Best Practice Score, the impressed base score of 50 is reduced by the sum of the scored variances. In this example, the sum of the variances is −7.75, resulting in a score of 42.25.

Following the best practice comparison, the functions are then weighted vis-à-vis their importance to the business using an algorithm designed to account for the interdependence of the functions (step 316). The collective information—metrics, KBIs, best practice comparisons and function weightings—is then used to calculate the actual productivity, scalability, profitability and alpha generation levels of the business (step 318). These measures are intermediate calculations and expressed as the Operational Performance Benchmarks (OPBs) as they do not yet include an operational risk perspective. The OPBs provide an understanding of the interdependence of the business activities and functions and their relation to the business as a whole.

After the Operational Performance Benchmarks have been computed, a risk assessment is performed (step 320). For this example, the risk assessment is based on four risk factors: people, processes, technology and external factors. Examples of risk factors are detailed in Table 14.

TABLE 14

Risk Factors.

| Risk Factors | Drivers |
|---|---|
| People | Appropriateness of skills & experience<br>Adequacy of resources<br>Stability of staff<br>Commitment to ethics<br>Level of oversight |

TABLE 14-continued

Risk Factors.

| Risk Factors | Drivers |
|---|---|
| Processes | Effectiveness of control checks<br>Prevalence of manual processes<br>Awareness of risk exposures<br>Accuracy & timeliness of data access, handling, processing & delivery<br>Separation of responsibilities, control checks & oversight<br>Clarity of policies and procedures |
| Technology | Reliability<br>Redundancy<br>Security<br>Contingency |
| External Factors | Awareness of external factors (physical environment, counterparty, regulatory)<br>Preparedness to respond to external factors |

The risk assessment is accomplished by applying a risk assessment algorithm to the collective data as it effects the drivers for each Risk Factor. The risk assessment algorithm may include a weighted average. That is, each Driver in Table 14 is assigned a grade, or score from 1–100 indicating how well the driver is performing. For example, the Technology Risk Factor may have a 90 in Reliability, 80 in Redundancy, 67 in Security and 75 in Contingency. These are the Risk Driver Ratings and the Security driver is creating the highest risk.

The weighted average of the Risk Driver Ratings for each Risk Factor is calculated to obtain the Risk Factor Weightings. The weighted average of the Risk Factor Weightings is then calculated to obtain an overall Risk Assessment.

The inventive method calculates the enterprise risk level of the business using an enterprise risk algorithm in the same fashion using the Risk Ratings for each Function (step 322). The enterprise risk score 324 measures the level of risk in the business.

The inventive method culminates in computing a measure of the consistency potential of the business (step 328) by factoring the business drivers together using a consistency potential algorithm that measures the potential of the business to perform consistently in the future. Again, the consistency potential algorithm may be a combined weighted average of any one or more of the Performance Ratings, Risk Ratings, KBIs and OPBs of each Function to obtain final measures of productivity, scalability, profitability, alpha generation and operational risk for the business, or enterprise, as a whole (step 326). The assessment 330 of the consistency potential measures the potential of the business to perform consistently over time, thus providing a forward-looking perspective.

In accordance with alternative embodiments of the present invention, the inventive method may be implemented with software. It is well within the skill of an ordinary software engineer to develop a program that would do so. Therefore, any additional explanation and detail about computer systems is omitted. Such a program would include computer-executable process steps, or program instructions, that would instruct a processor to gather the information and perform the mathematical calculations and statistical analyses required by the inventive metrics, in the manner and the order disclosed above.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for evaluating a financial services business, wherein said business includes a plurality of financial services related functions each having a plurality of activities, the method comprising:
   (a) selecting an activity related to one of said functions of said financial services business;
   (b) collecting experiential data generated during performance of internal operations of said financial services business, wherein said internal operations are related to said selected activity;
   (c) using a computing system to calculate activity key business indicators (KBIs) for said selected activity by applying metrics to said experiential data, wherein said metrics correspond to financial services specific drivers such that said activity KBIs correspond to said financial services specific drivers, wherein said financial services specific drivers comprise (1) a risk driver, (2) an alpha generation driver, (3) a productivity driver, (4) a profitability driver, and (5) a scalability driver, wherein step (c) comprises applying all of said drivers to said selected activity to thereby calculate for said selected activity an activity KBI for each of said drivers;
   (d) using said computing system to calculate function KBIs for said one of said functions related to said selected activity, wherein step (d) comprises applying all of said drivers to said one of said functions to thereby calculate for said one of said functions a function KBI for each of said drivers; and
   (e) using said computing system to generate an overall risk assessment for said business using results of at least steps (c) and (d);
   wherein by applying all of said drivers to said selected activity and said one of said functions, interrelationships between said functions are considered when generating said overall risk assessment for said financial services business in step (e); and
   wherein steps (a)–(d) are repeated such that all of said financial services specific drivers are applied against all of said functions and all of said activities.

2. The method of claim 1 wherein said one of said functions is related to one of:
   research,
   portfolio management,
   sales,
   client service,
   management,
   treasury,
   compliance,
   controller operations, or
   information technology.

3. The method of claim 1 wherein the experiential data is collected from operating systems, databases, interviews and financial records.

4. The method of claim 1, wherein step (d) comprises:
   generating function KBIs for said functions by weighting associated activity KBIs according to their importance to said functions.

5. The method of claim 4, further comprising:
   determining variances between mapped workflows of said activities to control checks, wherein each of said variances is associated with one or more of said financial services drivers;
   scoring said variances to obtain variation scores for said activities; and
   calculating control check scores for said activities based on said variation scores.

6. The method of claim 1, wherein said experiential data is generated and stored in disparate systems, wherein step (b) comprises:
   mining said disparate systems to extract said experiential data.

7. The method of claim 5, wherein in step (c) activity risk KBIs for said activities are calculated by applying activities metrics related to said risk driver to said experiential data, wherein said activity risk KBIs represent risk scores, and also represent an overall assessment of risk, said method further comprising:
   generating operational performance measures by weighting said function KBIs according to importance of associated functions to said business.

8. The method of claim 7, further comprising:
   calculating new driver scores for said financial services specific drivers.

9. The method of claim 8, wherein step (e) comprises:
   generating said overall risk assessment of said business by combining at least function KBIs of said functions, activity KBIs of said activities of said functions, said operational performance measures, said control check scores, said risk scores and said driver scores.

10. The method of claim 9, further comprising:
    generating overall assessments for alpha generation, productivity, profitability and scalability drivers.

11. The method of claim 10, further comprising:
    generating an overall score of said business by combining said overall assessments for said risk, alpha generation, productivity, profitability and scalability drivers.

12. The method of claim 11, wherein said business overall score is used to evaluate past performance of said business.

13. The method of claim 11, wherein said business overall score is used to evaluate future potential of said business.

14. A computer program product comprising a computer useable medium having computer program logic recorded thereon for causing a computing system to evaluate a financial services business, wherein said business includes a plurality of financial services related functions each having a plurality of activities, the computer program logic comprising:
   first means for causing said computing system to select an activity related to one of said functions of said financial services business;
   second means for causing said computing system to collect experiential data generated during performance of internal operations of said financial services business, wherein said internal operations are related to said selected activity;
   third means for causing said computing system to calculate activity key business indicators (KBIs) for said selected activity by applying metrics to said experiential data, wherein said metrics correspond to financial services specific drivers such that said activity KBIs correspond to said financial services specific drivers, wherein said financial services specific drivers comprise (1) a risk driver, (2) an alpha generation driver, (3) a productivity driver, (4) a profitability driver, and (5)

a scalability driver, wherein said third means causes said computing system to apply all of said drivers to said selected activity to thereby calculate for said selected activity an activity KBI for each of said drivers;

fourth means for causing said computing system to computing system to calculate function KBIs for said one of said functions related to said selected activity, wherein said fourth means causes said computing system to apply all of said drivers to said one of said functions to thereby calculate for said one of said functions a function KBI for each of said drivers; and fifth means for causing said computing system to generate an overall risk assessment for said business using results generated by said third and fourth means;

wherein by applying all of said drivers to said selected activity and said one of said functions, interrelationships between said functions are considered when said fifth means generates said overall risk assessment for said financial services business;

wherein operation of said first, second, third and fourth means is repeated such that all of said financial services specific drivers are applied against all of said functions and all of said activities.

15. The computer program product of claim 14 wherein said one of said functions is related to one of:
research,
portfolio management,
sales,
client service,
management,
treasury,
compliance,
controller operations, or
information technology.

16. The computer program product of claim 14 wherein the experiential data is collected from operating systems, databases, interviews and financial records.

17. The computer program product of claim 14, wherein said fourth means comprises:
means for causing said computing system to generate function KBIs for said functions by weighting associated activity KBIs according to their importance to said functions.

18. The computer program product of claim 14, wherein said experiential data is generated and stored in disparate systems, wherein said second means enables said computing system to mine said disparate systems to extract said experiential data.

19. The computer program product of claim 14, wherein said computer program logic further comprises:
means for causing said computing system to determine variances between mapped workflows of said activities to control checks, wherein each of said variances is associated with one or more of said financial services drivers;
means for causing said computing system to score said variances to obtain variation scores for said activities; and
means for causing said computing system to calculate control check scores for said activities based on said variation scores.

20. The computer program product of claim 19, wherein said third means enables said computing system to calculate said activity risk KBIs by applying activities metrics related to said risk driver to said experiential data, wherein said activity risk KBIs represent risk scores, and also represent an overall assessment of risk, said computer program logic further comprising:
means for causing said computing system to generate operational performance measures by weighting said function KBIs according to importance of associated functions to said business.

21. The computer program product of claim 20, wherein said computer program logic further comprises:
means for causing said computing system to calculate driver scores for said financial services specific drivers.

22. The computer program product of claim 21, wherein said fifth means comprises:
means for causing said computing system to generate said overall risk assessment of said business by combining at least function KBIs of said functions, activity KBIs of said activities of said functions, said operational performance measures, said control check scores, said risk scores and said driver scores.

23. The computer program product of claim 22, wherein said computer program logic further comprises:
means for causing said computing system to generate overall assessments for alpha generation, productivity, profitability and scalability drivers.

24. The computer program product of claim 23, wherein said computer program logic further comprises:
means for causing said computing system to generate an overall score of said business by combining said overall assessments for said risk, alpha generation, productivity, profitability and scalability drivers.

25. The computer program product of claim 24, wherein said business overall score is used to evaluate past performance of said business.

26. The computer program product of claim 24, wherein said business overall score is used to evaluate future potential of said business.

27. A system for evaluating a financial services business, wherein said business includes a plurality of financial services related functions each having a plurality of activities, the system comprising:
first means for selecting an activity related to one of said functions of said financial services business;
second means for collecting experiential data generated during performance of internal operations of said financial services business, wherein said internal operations are related to said selected activity;
third means for calculating activity key business indicators (KBIs) for said selected activity by applying metrics to said experiential data, wherein said metrics correspond to financial services specific drivers such that said activity KBIs correspond to said financial services specific drivers, wherein said financial services specific drivers comprise (1) a risk driver, (2) an alpha generation driver, (3) a productivity driver, (4) a profitability driver, and (5) a scalability driver, wherein said third means applies all of said drivers to said selected activity to thereby calculate for said selected activity an activity KBI for each of said drivers;
fourth means for calculating function KBIs for said one of said functions related to said selected activity, wherein said fourth means applies all of said drivers to said one of said functions to thereby calculate for said one of said functions a function KBI for each of said drivers; and
fifth means for generating an overall risk assessment for said business using results of at least said third and fourth means;

wherein at least said third, fourth and fifth means execute in a computing system; and wherein by applying all of said drivers to said selected activity and said one of said functions, interrelationships between said functions are considered when said fifth means generates said overall risk assessment for said financial services business; and wherein operation of said first, second, third and fourth means is repeated such that all of said financial services specific drivers are applied against all of said functions and all of said activities.

* * * * *